United States Patent [19]

Kano et al.

[11] Patent Number: 5,333,770
[45] Date of Patent: Aug. 2, 1994

[54] SYSTEM FOR CONTROLLING TAPE TRAVELING HEIGHT AND TAPE GUIDE WITH TAPE EDGE DETECTOR THEREFOR

[75] Inventors: Kiyoshi Kano; Kichizaemon Okazaki, both of Yokohama, Japan

[73] Assignee: Hitachi, Ltd., Tokyo, Japan

[21] Appl. No.: 140,967

[22] Filed: Oct. 25, 1993

Related U.S. Application Data

[63] Continuation of Ser. No. 662,627, Feb. 27, 1991.

[30] Foreign Application Priority Data

Mar. 1, 1990 [JP] Japan ................................. 2-47227
Mar. 28, 1990 [JP] Japan ................................. 2-76860

[51] Int. Cl.$^5$ ............................................. B65H 23/35
[52] U.S. Cl. ............................................ 226/15; 226/20; 226/21
[58] Field of Search ............................ 360/71, 77.12; 242/57.1, 186; 226/15, 19, 20, 21

[56] References Cited

U.S. PATENT DOCUMENTS

| | | |
|---|---|---|
| 3,995,318 | 11/1976 | Serizawa ........................... 360/84 X |
| 4,363,042 | 12/1982 | Kimora et al. ......................... 360/71 |
| 4,453,659 | 6/1984 | Torpey ............................ 226/21 X |
| 4,573,619 | 3/1986 | Grant .......................... 360/77.12 X |
| 4,582,235 | 4/1986 | Schulz ............................ 242/186 X |
| 4,913,328 | 4/1990 | Schulz ................................ 226/21 |
| 4,964,557 | 10/1990 | Sarkisian et al. .............. 242/57.1 X |

FOREIGN PATENT DOCUMENTS 1-224966 9/1989 Japan.
1-269268 10/1989 Japan.

*Primary Examiner*—David L. Robertson
*Attorney, Agent, or Firm*—Antonelli, Terry, Stout & Kraus

[57] ABSTRACT

A tape travel controlling system in a recording/reproducing apparatus according to the present invention includes a tape width detector, a tape traveling path adjuster for changing a set condition(s) for a tape guide(s), and a tape traveling path controller, and is constructed so that the tape traveling path controller controls the amount of change in the set condition(s) for the tape guide(s) in the tape traveling path adjuster in accordance with an output signal provided from the tape width detector.

3 Claims, 9 Drawing Sheets

SYSTEM FOR CONTROLLING TAPE TRAVELING HEIGHT AND TAPE GUIDE WITH TAPE EDGE DETECTOR THEREFOR

This application is a continuation of application Ser. No. 662,627 filed on Feb. 27, 1991, now abandoned.

BACKGROUND OF THE INVENTION

The present invention relates to a recording/reproducing apparatus using tape, e.g. VTR, particularly to a tape travel controlling system and tape guide construction both suitable for stabilizing the traveling of tape.

The following two points are mentioned as factors of impeding a stable traveling of tape.

1) Variation in width of tape used.
2) Variation in winding height in the tape width direction, so-called "stepped winding," at a tape winding reel portion.

In connection with the above points 1) and 2), the following description is now provided about the respective present situations.

First, as to the above point 1), in today's tape recorders, for example in video tape recorders, a high density recording is the trend of the world. To this end, also as to the recording format, there is a tendency to narrower tracks. In order to ensure interchangeability under this situation, the accuracy of the width of tape as a recording medium is an important point.

More particularly, for ensuring interchangeability in a video tape recorder, a track pattern must be formed on tape so as to conform to a standardized recording format with a high accuracy. To this end, it is first required to suppress changes in the width direction of tape which is traveling. For this purpose, tape guides which define a tape traveling path in a video tape recorder are provided with flange portions for contact with the upper and lower ends of tape, thereby suppressing changes in the tape width direction. However, if the tape width accuracy is low and there is a width variation (variation from an average width value) or a width deviation (difference between average width values), an actual tape traveling path will be different from a tape traveling path which can form a track pattern conforming to the format defined by the flange portions of the tape guides. As a result, the linearity of a recording track formed on the tape is deteriorated and so at the time of playback in another video tape recorder there occurs a tracking error, leading to deterioration of reproducing characteristics.

A method commonly adopted for suppressing such deterioration in linearity of the recording track is to enhance the accuracy of the tape width. For example, according to a standard established in March 1982 regarding VHS type video tape recorders, the accuracy of the tape width is specified to be ±10 $\mu$m, and the linearity of the recording track is thereby defined to be 10 $\mu m_{p\text{-}p}$. According to the recent tape processing technique, there is attained a tape width accuracy of about 4 to 6 $\mu m_{p\text{-}p}$, thus fully satisfying the above condition, and the amount of deterioration in linearity of the recording track is about 2 to 3 $\mu m_{p\text{-}p}$, thus causing no specially serious problem in connection with the above condition.

However, according to a standard established on small-sized cassette high-definition VTR systems established in June 1989, the accuracy of the recording track linearity is specified to be 4 $\mu m_{p\text{-}p}$. In this case, the deterioration of the recording track linearity based on the foregoing tape width accuracy of 2 to 3 $\mu m_{p\text{-}p}$ becomes a serious problem.

One method for solving this problem is to further improve the tape width accuracy. However, since the tape is thin and long and such further improvement leads to an increase of cost, it is very difficult to further improve the tape width accuracy. In this connection, there has been found no example of any measure taken for the tape recorder body.

Now, the following description is provided about the present situation of the foregoing point 2). In a tape recorder, a tape is wound round two reels, and for example in the case of a cassette tape for 8 mm VTR, such reels are each provided with a pair of flange portions in corresponding relation to both edges of the tape. In a compact cassette for audio or DAT, though such flanges are not formed, two sheets are provided in the cassette to sandwich a tape in the tape width direction.

Such flanges or sheets are for preventing the tape from coming off a reel when wound round the reel or for preventing the tape from being displaced in its width direction and resulting in the so-called "stepped winding." There will be no such stepped winding if the spacing between the paired flanges or the two sheets is in conformity with the tape width. On the other hand, if a tape edge comes into sliding contact with such flange or sheet, there will occur a change in the tape traveling speed or damage of the tape edge. Therefore, it has heretofore been required to set the spacing between the paired flanges or two sheets somewhat larger than the tape width although the said spacing is set as close as possible to the tape width. For example, according to the standard on 8 mm VTR, the reel flange spacing is specified to be 8.3 to 8.9 mm relative to the tape width of 8.0 mm.

In the above prior art, therefore, the formation of a stepped winding corresponding to the larger spacing set as above has been unavoidable. But if there is a stepped winding on the tape wound-up reel, when the tape is then delivered from the reel, the tape traveling height varies in the reel position by an amount corresponding to the difference in height of the stepped winding, thus giving rise to the problem that the track tracing performance at the time of recording or reproducing is deteriorated.

Besides, a tape edge comes into strong sliding contact with a flange portion of a tape guide disposed near the reel. Further, the tape will undergo an out-of-plane deformation, so-called buckling, near the sliding contact portion with the flange, thus causing damage of the tape.

As an example of a measure taken against such problem, reference is here made to Japanese Patent Laid Open Nos. 1-224966 and 1-269268. In these two publications, a tape traveling height is detected by a sensor disposed near the supply reel and a control is made by feeding back the amount of variation in the said height to move the reel vertically. According to the disclosures of the publications in question, the traveling height of the tape delivered from the supply reel is thereby maintained constant and so the abovementioned problem is overcome.

SUMMARY OF THE INVENTION

However, the aforementioned two conventional techniques involve the following problems.

a) Since the sensor for detecting the tape traveling height is provided only near the supply reel in a forward traveling of the tape, the tape traveling height near the take-up reel cannot be detected, and for this reason there arise the following problems.
   i) It is difficult to prevent a stepped winding on the take-up reel.
   ii) It is difficult to prevent the tape traveling height from being influenced by the stepped winding on the take up reel when the take-up reel becomes the supply reel during reverse traveling of the tape.
b) For detecting the tape traveling height there is adopted a method wherein the height of a tape edge is detected at a portion where the tape is not in contact with a tape guide in the tape traveling path, so in the event the tape is curled, wrinkled or distorted, error appears easily in the detection of the tape traveling height.
c) For detecting the position of a tape edge there is used an optical sensor which is not in contact with the tape, but in this case it is necessary to adjust the sensor-tape distance with a high accuracy, and this easily leads to an increase of cost.

It is the object of the present invention to eliminate the influence of the foregoing factors 1) and 2) and provide a tape travel controlling system and a tape edge detector in a recording/reproducing apparatus capable of ensuring a stable tape traveling.

In order to achieve the above-mentioned object the present invention is constructed as follows. 1) There are provided a tape width detector for detecting the width of a tape which is traveling, a tape traveling path adjuster for modifying a tape traveling path, and a tape traveling path controller for controlling the amount of change for the tape traveling path adjuster in accordance with the output of the tape width detector.

2) In the vicinity of each of the supply reel and the take-up reel there are provided a height detector for detecting a tape traveling height, a height adjuster for changing the tape traveling height, and a height controller for controlling the amount of change for the height adjuster in accordance with the output of the height detector.

3) There is provided a tape edge detector for detecting the position of a tape edge in the tape width direction at a portion of the tape traveling path where the tape is in engagement with a tape guide.

In the construction 1)

The tape width detector detects a tape traveling width continually, and an output corresponding to the detected value is fed to the controller. At this time, if there is an error from a standard size, a driving power corresponding to the amount of error is fed from the controller to the tape traveling path adjuster. As a result, the tape traveling path changes to compensate for the deterioration of the track linearity caused by the error in the tape width, whereby the performance deterioration caused by the tape width error can be avoided.

In the construction 2)

When a stepped winding portion deviated from a reference tape winding height appears on the supply reel, the tape traveling height changes and the signal provided from the height detector also changes. The controller transmits to the height adjuster a driving signal to correct the change in the tape traveling height, whereby the tape traveling height in the vicinity of the supply reel is maintained constant at the reference value and the influence of the stepped winding can be prevented.

When the tape traveling height detected by the height detector on the take-up side deviates from the reference height, the signal from the height detector also changes accordingly. In accordance with this variation the controller provides a driving signal to the height adjuster to correct the variation in the tape traveling height, whereby the tape winding height between the flanges of the take-up reel is maintained constant at the reference value and so it is possible to prevent the formation of a stepped winding.

In the construction 2), moreover, since the height detector and the height adjuster are provided for each of the two reels, the aforementioned stepped winding influence preventing function and the stepped winding formation preventing function both can be obtained in both forward and reverse tape traveling directions.

In the construction 3)

A traveling tape undergoes a predetermined tension in its longitudinal direction. Therefore, at a portion of the tape which is in engagement with a tape guide, the tape is pressed or stretched to follow the surface shape of the tape guide, so that the position of a tape edge can be detected correctly even when the tape is curled, wrinkled, or distorted,

DETAILED DESCRIPTION OF THE PREFERRED EMBODIMENTS

Embodiments of the present invention will be described in detail hereinunder with reference to the accompanying drawings.

Figure 1:
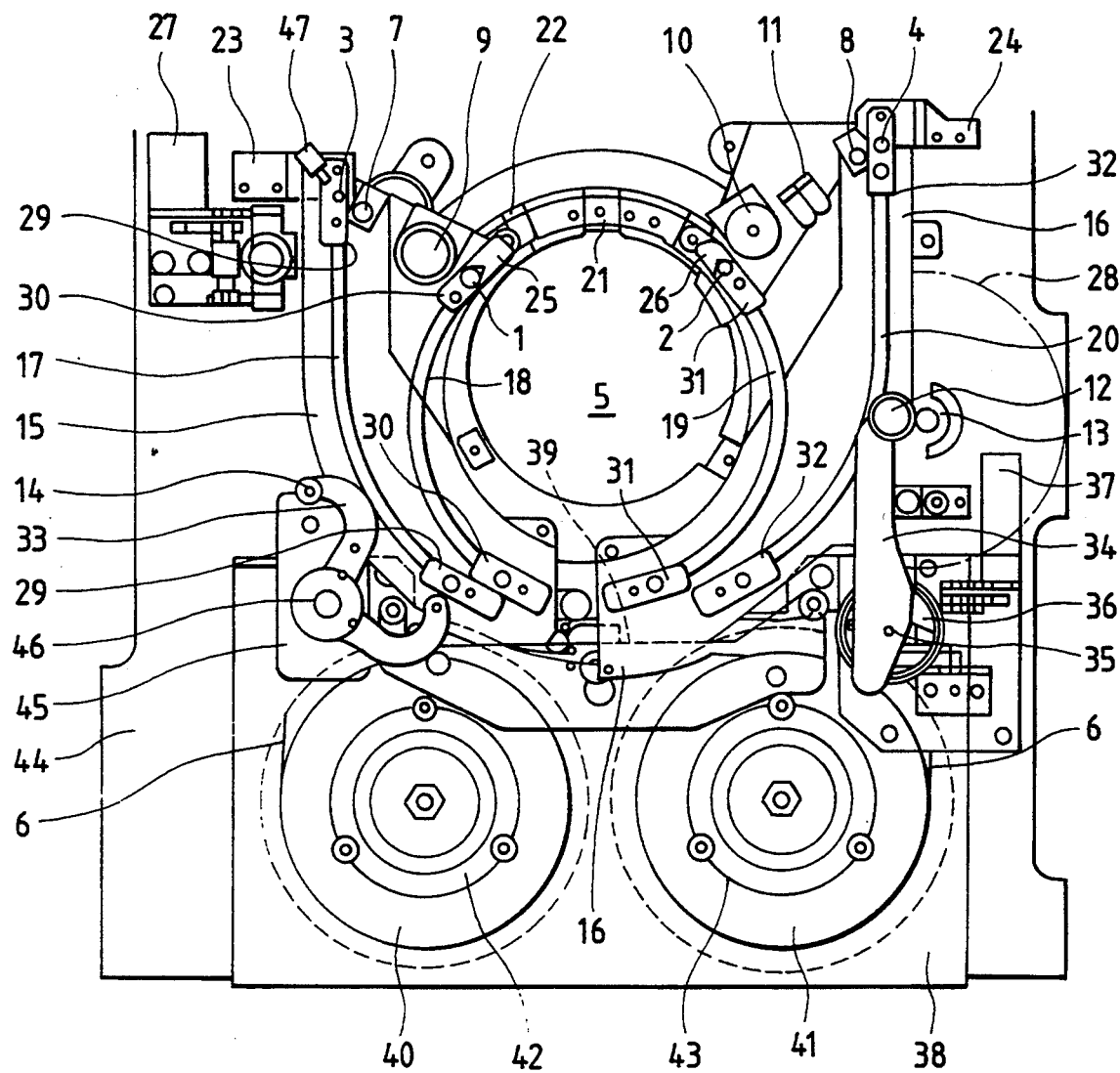
FIG. 1 is an entire plan view of a tape travel controlling system in a recording/reproducing apparatus according to an embodiment of the present invention.

First, the entire apparatus will be outlined. FIG. 1 is a plan view showing the application to a video tape recorder of a tape travel controlling system in a recording/reproducing apparatus according to an embodiment of the present invention. In the same figure, the reference numerals 1 and 2 denote guide rollers serving as width restricting guides; numerals 3 and 4 denote guide rollers; numeral 5 denotes a cylinder; numeral 6 denotes a magnetic tape; numerals 7 and 8 denote inclined guides; numerals 9 and 10 denotes impedance rollers; numeral 11 denotes an AC (audio control) head; numerals 12, 13 and 14 denote a pinch roller, a capstan and a tension pin, respectively; numerals 15 and 16 denote guide plates; numerals 17 to 20 denote guide slots; numerals 21 and 22 denote loading rings; numerals 23 to 26 denote catchers; numerals 27 and 28 denote a loading motor and a capstan motor, respectively; numerals 29 to 32 denote guide bases; numerals 33, 34 and 35 denote a tension lever, a pinch roller arm and a pin, respectively; numerals 36, 37 and 38 denote a worm wheel, a pinch roller driving motor and a tape cassette, respectively; numerals 39, 40 and 41 denote an opening, a supply reel and a take-up reel, respectively; numerals 42, 43 and 44 denote a supply reel turntable, a take-up reel turntable and a chassis, respectively; numerals 45, 46 and 47 denote a tension plate, a pin and a photosensor, respectively.

In FIG. 1, a cylinder 5 is provided on a chassis 44 inclinedly at a predetermined angle, and on one side of the cylinder 5 is provided a guide plate 15, while on the other side is provided a guide plate 16. The guide plates 15 and 16 are disposed so that one end portions thereof are partially positioned in an opening 39 of a tape cassette 38 which has been loaded and from this position the guide plates extend along the cylinder 5. The other end portions of these guide plates are a little wider than their end portions on the tape cassette 38 side. The other end portion of the guide plate 15 corresponds to the side where a magnetic tape 6 is wound onto the cylinder 5 in a forward traveling of the tape, that is, an upstream side of the cylinder, while the other end portion mentioned above of the guide plate 16 corresponds to the side where the tape 6 leaves the cylinder 5, that is, a downstream side of the cylinder.

In the guide plate 15 are formed two guide slots 17 and 18 extending from the end portion of the guide plate on the opening 39 side of the tape cassette 38 to the upstream end of the cylinder 5. The guide slot 18 is positioned closer to the cylinder 5 than the guide slot 17, and one end thereof is positioned near the same cylinder. Catchers 23 and 25 are provided at the end portions of the guide slots 17 and 18, respectively, on the upstream side of the cylinder 5. Guide bases 29 and 30 carrying thereon a guide roller 3 and a guide roller 1 serving as a width restricting guide, respectively, are mounted to the guide plate 15 so as to be movable along the guide slots 17 and 18, respectively. At one ends of the guide slots 17 and 18 the guide bases 29 and 30 are positioned in the opening 39 of the tape cassette 38, while at the other ends of those guide slots the guide bases 29 and 30 are positioned by the catchers 23 and 25, respectively.

Also in the guide plate 16 are formed two guide slots 19 and 20 extending from the end portion of the guide plate on the opening side of the tape cassette 38 to the end portion on the downstream side of the cylinder 5. The guide slot 19 is located closer to the cylinder 5 than the guide slot 20 and one end thereof is positioned near the cylinder. Catchers 26 and 24 are provided at the end portions of the guide slots 19 and 20, respectively, on the downstream side of the cylinder 5. Guide bases 31 and 32 which carry thereon a guide roller 2 as a width restricting guide and a guide roller 4, respectively, are mounted to the guide plate 16 movably along the guide slots 19 and 20. At one ends of the guide slots 19 and 20 the guide bases 31 and 32 are positioned in the opening 39 of the tape cassette 38, while at the other ends of those guide bases 31 and 32 are positioned by the catchers 26 and 24, respectively.

In the state shown in FIG. 1, the guide bases 29, 30, 31 and 32 are located at both ends of the guide slots 17, 18, 19 and 20.

Figure 2:
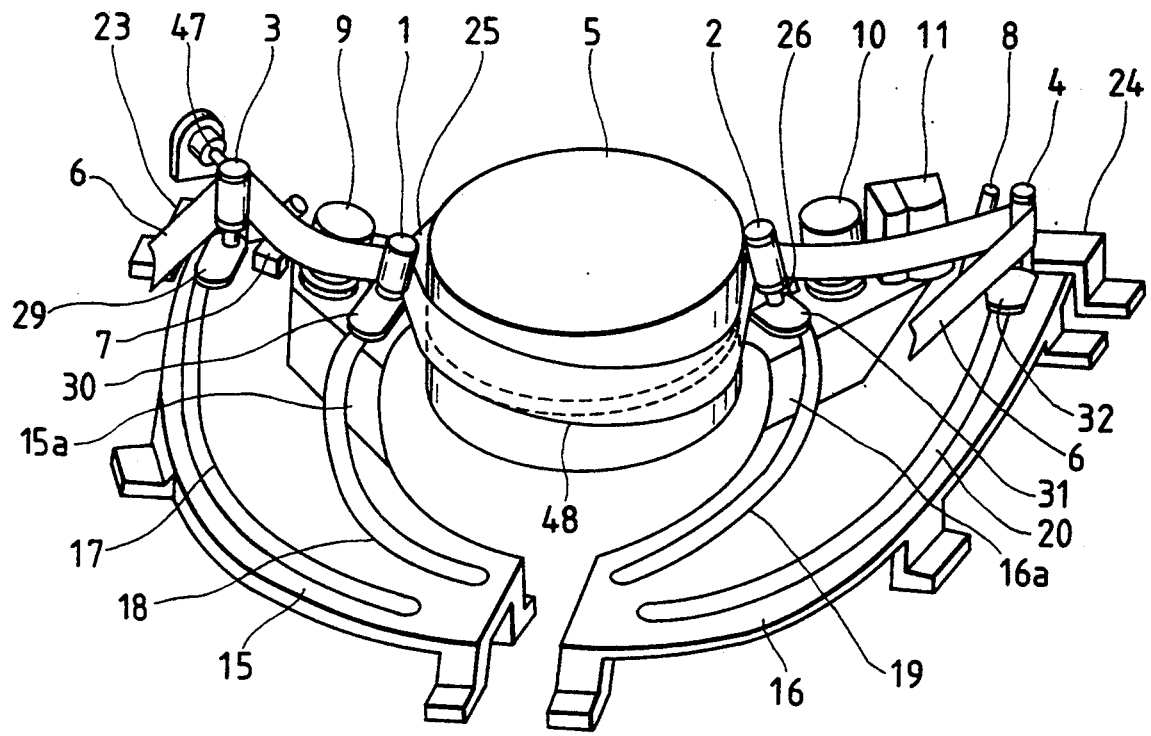
FIG. 2 is a perspective view showing a tape traveling path in FIG. 1.

FIG. 2 is a perspective view showing the guide plates 15, 16 and related portions. Numerals 15a and 16a denote inclined portions, and numeral 48 denotes a tape lead portion. The portions common to FIG. 1 are indicated by the same reference numerals.

In FIG. 2, the portion of the guide plate 15 where the guide slot 17 is formed is parallel to the chassis 44 (FIG. 1), while at the portion thereof where the guide slot 18 is formed, an inclined portion 15a is provided on the upstream side of the cylinder 5 which inclined portion is inclined from the portion parallel to the chassis 44 to the said upstream side upwards relative to the chassis 44. Thus, the guide slot 17 extends in parallel with the chassis 44, while the guide slot 18 extends in parallel with the chassis 44 from the end portion on the tape cassette 38 (FIG. 1) side, then from an intermediate part it extends upward at the inclined portion 15a up to the aforesaid upstream side.

As to the guide plate 16, the portion thereof where the guide slot 20 is formed is parallel to the chassis 44, while at the portion thereof where the guide slot 19 is formed, an inclined portion 16a is provided on the downstream side of the cylinder 5 which inclined portion is inclined from the portion parallel to the chassis 44 to the said upstream side downwards relative to the chassis. Thus, the guide slot 20 extends in parallel with the chassis 44, while the guide slot 19 extends in parallel with the chassis 44 from the end portion on the tape cassette 38 side, then from an intermediate part it extends downward at the inclined portion 16a up to the downstream side of the cylinder 5.

The guide slots 17 to 20 are formed as above, so when the guide bases 29 to 32 are moved from the tape cassette 38 side, the guide bases 29 and 32 move in parallel with the chassis 44 along the guide slots 17 and 20, respectively. In this case, the guide base 30 moves in parallel with the chassis 44 and then moves upward, while the guide base 31 moves in parallel with the chassis 44 and then moves downward. In this way both reach the positions defined by the catchers 25 and 26, respectively, near the cylinder 5.

In the state shown in FIG. 2, the guide bases 29, 30, 31 and 32 are positioned by the catchers 23, 25, 26 and 24, respectively. In this state, an inclined guide 7 and an impedance roller 9 are provided on the guide plate 15 from the guide roller 3 side so as to be positioned between the guide rollers 3 and 1 on the guide bases 29 and 30, while an impedance roller 10, an AC head 11 and an inclined guide B are provided on the guide plate 16 from the guide roller 2 side so as to be positioned between the guide rollers 2 and 4 on the guide bases 31 and 32.

Turning back to FIG. 1, two loading rings 21 and 22 are provided on the chassis 45 so as to turn around the cylinder 5. The loading rings 21 and 22 are disposed up and down, both passing below the guide places 15 and 16. The loading rings 21 and 22 are connected through a gear portion to a loading motor 27 mounted to the upper surface of the chassis 44, and they are rotated in directions opposite to each other by means of the loading motor 27. The rotation of the loading ring 21 causes the guide bases 29 and 30 to move, while the guide bases 31 and 32 are moved by the rotation of the loading rings 22. With respect to the center of rotation, the rotational angle of the loading ring 21 and that of the loading ring 22 ar set at 108° and 120°, respectively. Therefore, the rotating speed of the ring 21 and that of the ring 22 are different from each other. A small-sized magnet is attached to the underside of the loading ring 22, while a sensor such as Hall element is attached to the chassis 44. The sensor detects the small-sized magnet, whereby a stop timing of the loading rings 21 and 22 is obtained.

On a supply reel 40 side of the tape cassette 38 there is provided a tension lever 33 pivotably about a pin 46 on a tension plate 45, and a tension pin 14 is implanted in the front end of the tension lever 33.

On a take-up reel 41 side of the tape cassette 38 there is provided a worm wheel 36 which is driven rotatively by a pinch roller driving motor 37, and a pinch roller arm 34 is fitted on a pin 35 provided on the shaft to which is mounted the worm wheel 36. At the front end of the pinch roller arm 34 there is provided a pinch roller 12. The pinch roller arm 34 is pivoted clockwise about the pin 35 by the pinch roller driving motor 37, whereby the pinch roller arm 12 can be brought into abutment with a capstan 13 which is rotated by a capstan motor 28.

The operation of this embodiment will be described below. It is now assumed that the apparatus is in a state of unloading with the tape cassette 38 mounted thereon. In this state, the supply reel 40 of the tape cassette 38 is carried on a supply reel turntable 42 mounted rotatably on the chassis 44, while the take-up reel 41 is carried on a take-up reel turntable 43, and the magnetic tape 6 is stretched between the supply reel 40 and the take-up reel 41 in the tape cassette 38. At this time, the guide rollers 3, 1, 2 and 4 mounted on the guide bases 29, 30, 31 and 32, respectively, the tension pin 14 on the tension lever 33 and the pinch roller 12 on the pinch roller arm 34 are located in positions innerer than the magnetic tape 6 in the opening 39 of the tape cassette 38.

Upon start-up of a loading operation in this state, the loading ring 21 is rotated clockwise by the loading motor 27, and the guide bases 29 and 30 move along the guide slots 17 and 18, respectively, while the loading ring 22 rotates counterclockwise and the guide bases 31, 32 move along the guide slots 19, 20, respectively.

With the counterclockwise rotation of the loading ring 22, the tension lever 33 rotates in the same direction with play relative to the loading ring 22. Further, the pinch roller arm 34 is turned clockwise by the rotation of the pinch roller driving motor 37.

With the movement of the guide bases 29, 30, 31 and 32, the guide rollers 3, 1, 2 and 4 mounted thereof come into engagement with the magnetic tape 6 in the tape cassette 38 and draw out the tape from the tape cassette. At this time, the tension pin 14 and the pinch roller 12 are in abutment with the magnetic tape 6, but do not contribute to the drawing-out operation for the magnetic tape 6 from the tape cassette 38.

Thereafter, the guide bases 29, 30, 31 and 32 reach the catchers 23, 25, 26 and 24 and are positioned thereby. As shown in FIG. 2, the magnetic tape 6 is wound round the outer periphery of the cylinder 5 over a predetermined angular range and along the spiral tape lead portion 48. Now, the loading operation is over.

Figure 3:
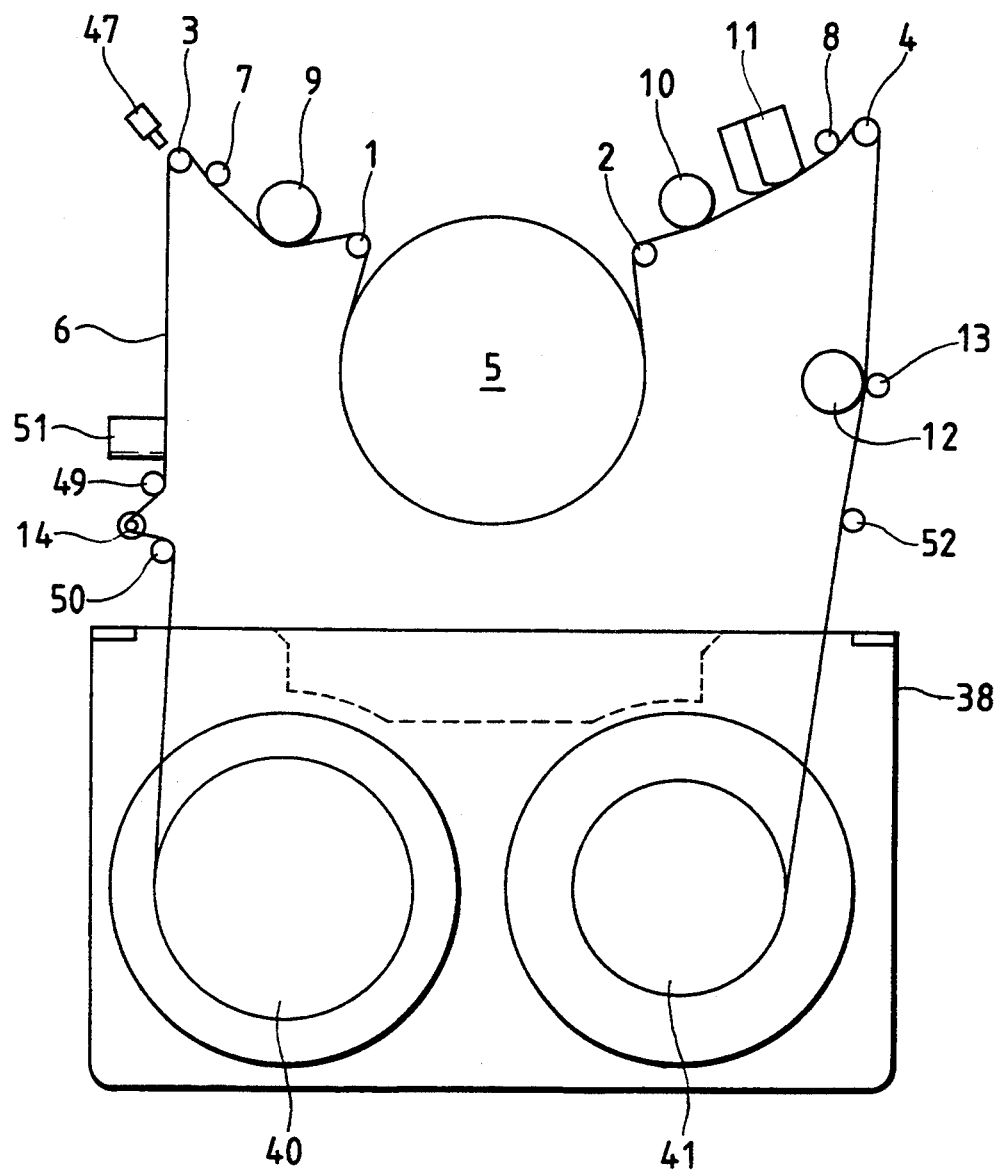
FIG. 3 is a plan view thereof.

FIG. 3 is a plan view showing a tape traveling path in the thus-loaded state, in which the numerals 49 and 50 denote tension guide rollers, numeral 51 denotes a full width erase head and numeral 52 denotes a guide roller, and in which the portions common to FIG. 1 are indicated by the same reference numerals.

In the same figure, the magnetic tape 6 from the supply reel 40 comes into abutment with the tension guide roller 50, tension pin 14 and tension guide roller 49, then abuts the full width erase head 51 and thereafter its traveling direction is changed toward the cylinder 5 by the guide roller 3. Then, the surface of the tape 6 is inclined by the inclined guide 7 in accordance with the inclination of the cylinder 5, then comes into contact with the impedance roller 9 and is thereafter brought into abutment with the cylinder 5 by the guide roller 1 which is a width restricting guide.

On the downstream side of the cylinder 5 the magnetic tape 6 from the cylinder 5 abuts the guide roller 2 serving as a width restricting guide, then comes into contact with the impedance roller 10 and the AC head 11. Thereafter, at the inclined guide 8 the tape surface becomes perpendicular to the chassis 44 (FIG. 1) and the tape travelling direction is changed toward the tape cassette 38 by the guide roller 4. Then, the magnetic tape 6 passes between the pinch roller 12 and the capstan 13, comes into abutment with the guide roller 52 and is wound onto the take-up reel 41 of the tape cassette 38.

The tape traveling path is thus formed and the magnetic tape 6 is sandwiched in between the pinch roller 12 and the capstan 13. In this state, when the capstan 13 is rotated by the capstan motor 28, the tape 6 travels along this path. At this time, the tape tension is detected by the tension pin 14 and a load corresponding to the detected value is imposed on the supply reel 40 to maintain the tape tension constant.

Referring to FIGS. 1 to 3, when the magnetic tape 6 loaded as above travels, the width of the portion thereof wound round the guide roller 3 is measured by a photosensor 47 provided near the guide roller 3. The guide roller 1 is provided with a height adjuster for changing the traveling height of the magnetic tape 6. The height adjuster changes the traveling height of the tape 6 in accordance with the result of the measurement made by the photosensor 47. Consequently, even if the width of the tape 6 changes, the tape extends along the tape lead portion 48 (FIG. 2) of the cylinder 5 in a correct state and hence a recording track of good linearity is ensured on the tape.

Figure 4A:
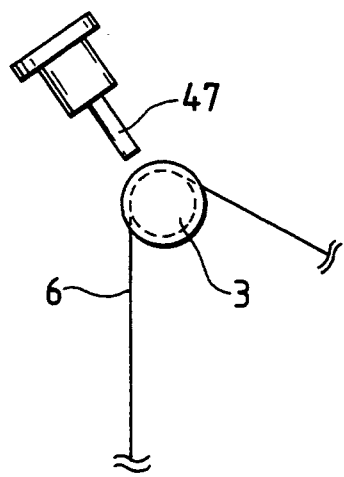
FIG. 4(a) is a top view showing an example of a detector in FIG. 1.
Figure 4B:
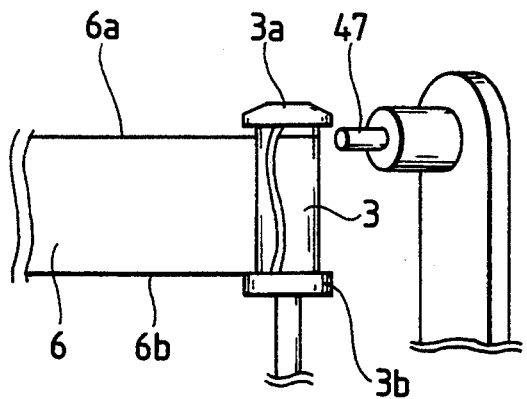
FIG. 4(b) is a side view thereof.

FIGS. 4(a) and 4(b) illustrate the foregoing detector for measuring the width of the magnetic tape 6, in which FIG. 4(a) is a top view and FIG. 4(b) is a side view. In FIGS. 4(a) and 4(b), numeral 3a denotes an upper flange portion, numeral 3b denotes a lower flange portion, numeral 6a denotes an upper end of the magnetic tape 6, numeral 6b denotes a lower end of the magnetic tape 6, 6b a lower end, and the portions common to FIG. 1 are indicated by the same reference numerals.

According to a method commonly adopted for restricting the width of a traveling magnetic tape in a video tape recorder, there are used a plurality of tape guides having flange portions spaced a little wider than the tape width; the lower end of the magnetic tape is brought into abutment with the lower flange portion of the first tape guide as viewed in the tap traveling direction; then the upper end of the tape is brought into abutment with the upper flange portion of the next tape guide; then the lower end of the tape is abutted with the lower flange portion of the third tape guide; in this way the upper and lower flange portions of the tape guides are abutted in an alternate manner with the upper and lower ends of the magnetic tape, whereby the tape is sandwiched in between the plural tape guides to restrict the height thereof.

Also in the embodiment illustrated in FIGS. 1 to 3, the guide rollers 1, 3 and the tension guide roller 49 on the incoming side of the cylinder 5, as well as the guide rollers 2, 4, 52 on the outgoing side of the same cylinder, are all provided with flange portions, and the tape lead portion 48 of the cylinder 5 restricts the lower end of the magnetic tape 6. Therefore, according to the above method for restricting the height of the tape 6, the guide roller 1, the guide roller 3 and the tension guide roller 49 restrict the height of the tape 6 at the respective upper flange portion, lower flange portion and upper flange portion.

In FIG. 4(b), the upper and lower flange portions 3a, 3b of the guide roller 3 are spaced a little wider than the width of the magnetic tape 6. The tape 6 travels in engagement with part of the outer surface of the guide roller 3 while its lower end 6b is in contact with the lower flange portion 3b. That is, the lower end 6b of the traveling magnetic tape 6 abuts the lower flange portion 3b, whereby the height of the tape is restricted.

The photosensor 47, disposed near the tape guide 3, is provided with a light emitting element and a light receiving element. A region which is the center of the tape-engaged portion of the tape guide 3 as shown in FIG. 4(a) and which includes the upper end 6a of the magnetic tape 6 as shown in FIG. 4(b), is irradiated with light and the reflected light is received, by means of the photosensor 47. The surface of the tape 6 is finished to have a high reflectivity and the lower end 6b of the magnetic tape 6 is always in abutment with the lower flange portion 3b of the tape 6, so when the width of the tape changes and the upper end 6a of the tape changes its position vertically at the tape-engaged portion of the tape guide 3, the amount of the reflected light received by the photosensor 47 changes. Thus, the output level of the photosensor 47 and the width of the magnetic tape 6 are in corresponding relation to each other.

The tape traveling path adjuster for modifying the same path will be described below.

When a magnetic tape having a width different from a specified value is allowed to travel along a tape traveling path which is formed by adjusting the height of guide rollers so as to minimize a bend of a recording track (hereinafter referred to as "track bend") formed on a magnetic tape having a width of the specified value, if the width of the former magnetic tape is smaller than the specified value, the magnetic tape will float beyond the tape lead portion 48 (FIG. 2) of the cylinder 5 thus causing a track bend, while if the said width is larger than the specified value, a slight out-of-plane deformation, so-called buckling, will occur in the vicinity of the tape lead portion 48 of the cylinder 5, thus also causing a track bend.

Figure 5:
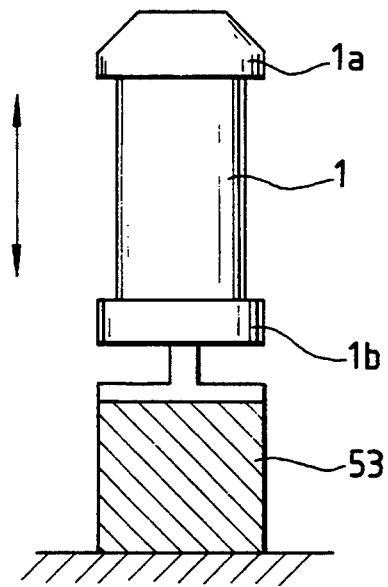
FIG. 5 is a side view showing an example of a tape traveling path adjuster in FIG. 1.

To prevent such inconvenience, when the width of a magnetic tape is smaller than the specified value, the height of the tape on the cylinder 5 is decreased, while when the width of the tape is larger than the specified value, the height of the tape on the cylinder is increased, so as to modify the tape traveling path so that the lower end of the tape abuts the tape lead portion 48 of the cylinder. In this embodiment, a tape traveling path adjuster for finely adjusting the height of the magnetic tape is attached to the guide-roller 1 (FIGS. 1 to 3) located just before the incoming side of the cylinder 5. This traveling path adjuster will be described below with reference to FIG. 5. In the same figure, the reference numerals 1a, 1b and 53 denote an upper flange portion, a lower flange portion and a laminated ceramic, respectively.

The guide roller 1, having upper and lower flange portions 1a, 1b, are mounted on a laminated ceramic 53 which is a piezoelectric element. when voltage is applied to the laminated ceramic 53, the guide roller 1 slightly moves vertically. As mentioned above, the upper end of the magnetic tape is in abutment with the upper flange portion 1a of the guide roller 1, whereby the height of the tape is restricted. Therefore, as the guide roller 1 moves vertically upon application of a voltage to the laminated ceramic 53, the magnetic tape also moves vertically to change the abutment height thereof on the cylinder 5 (FIG. 2).

Although voltage can be applied any time to the laminated ceramic 53, a construction may be made so that in the loading completed stated shown in FIGS. 2 and 3 it becomes possible to apply voltage to the laminated ceramic.

Figure 6:
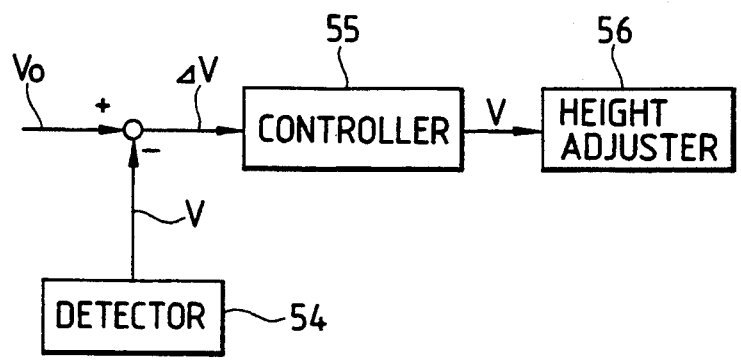
FIG. 6 is a block diagram showing an example of means for controlling the tape traveling path adjuster in accordance with a detected output from the detector in FIG. 1.

The voltage to be applied to the laminated ceramic 53 is determined in accordance with a detected output from the photosensor 47 in FIGS. 4(a) and 4(b). The following description is now provided with reference to FIG. 6 about means for controlling the tape traveling path adjuster shown in FIG. 5 on the basis of the detected output from the said detecting means. In FIG. 6, the numeral 54 represents the detector shown in FIGS. 4(a) and 4(b), numeral 55 represents the controller, and numeral 56 represents the tape traveling path adjuster shown in FIG. 5.

In this concrete example, the width of a magnetic tape (hereinafter referred to as "reference magnetic tape") having a width of a specified value is detected in advance and with this width as a zero reference, an amount of variation in width of a magnetic tape ("actual magnetic tape") which is used actually, from the zero reference is detected, and the tape traveling path adjuster is controlled in accordance with the detected amount of variation.

In FIG. 6, in order to set the zero reference in advance, the reference magnetic tape is loaded and traveled, while the width thereof is detected by the detector 54. The level of an output signal of the detector 54 (an output signal of the photosensor 47) is held as a reference value $V_0$ serving as the zero reference. At this time, a tape traveling path is formed so that the lower end of the reference magnetic tape is in abutment with the tape lead portion 48 (FIG. 2) of the cylinder 5.

In the case of recording using the actual magnetic tape, there is determined a difference value $\Delta V$ between the output level V of the detector 54 and the reference value $V_0$, and the difference value $\Delta V$ is fed to the controller 55. The difference value $\Delta V$ corresponds to the difference between the amount of light received in the photosensor in the use of the reference magnetic tape and that in the use of the actual magnetic tape, and hence corresponds to the difference between the width of the reference magnetic tape and that of the actual magnetic tape.

In the controller 55 there are stored data which represent a correlation between the difference value ΔV and a driving voltage for inducing an amount of height adjustment of the tape guide 1 to bring the lower end of the magnetic tape into abutment with the tape lead portion 48 of the cylinder 5. When the difference value ΔV is fed, a driving voltage v of a corresponding level is outputted from the controller 55 and fed to the tape traveling path adjuster 56. That is, in FIG. 5, the said driving voltage is applied to the laminated ceramic 53 and the height of the guide roller 1, namely the height of the upper flange 1a, changes, so the height of the actual magnetic tape 6 on the cylinder 5 in FIG. 2 changes and the lower end of the tape comes into abutment with the tape lead portion 48.

In this way, even when the width of the actual magnetic tape is different from the specified value, the tape traveling path is modified so that the lower end of the tape is kept in abutment with the tape lead portion 48 of the cylinder 5, whereby the linearity of the recording track formed on the actual magnetic tape is kept very high.

Although in the above embodiment the detector for detecting the width of the magnetic tape 6 is attached to the guide roller 3, it may be provided in another member. For example, the detector may be attached to the tension guide roller 49 for restricting the height of the tape 6 at the upper flange portion thereof. In this case, however, it goes without saying that a construction is made to let the photosensor 47 receive the light reflected from the region including the lower end of the magnetic tape 6.

Although in the above embodiment the photosensor 47 is disposed to detect the center of the tape-engaged portion of the tape guide 3 as shown in FIG. 4(a) so as to prevent the occurrence of such an error as detecting a smaller value than the value of the true width even in the event of an initial deformation rounded in the width direction of the tape, so-called curling, the photosensor may be disposed in a somewhat deviated position therefrom and even in this case the influence of the curling is negligible, causing no problem. According to another method for eliminating the influence of the curling, the photosensor 47 is mounted to a stationary member with which the magnetic tape 6 comes into abutment, such as the full width erase head 51 (FIG. 3) and the AC head 11 (FIG. 1).

Moreover, although the photosensor 47 used in the above embodiment is a reflection type, it may be a coupler type wherein the magnetic tape 6 is sandwiched in between light emitting means and light receiving means.

Further, although in FIGS. 4(a) and 4(b) a single photosensor 47 is used for detecting the upper end side of the magnetic tape 6, there may be separately provided a photosensor for detecting the upper end side of the tape 6 and a photosensor for detecting the lower end side of the same tape, and the width of the tape may be determined on the basis of detected outputs provided from those photosensors.

In the above embodiment, not only during recording but also during playback the lower end of the magnetic tape 6 can be kept in abutment with the tape lead portion 48 of the cylinder 5 irrespective of the tape width. Therefore, also in the case where the magnetic tape is allowed to travel in the reverse direction to perform a reverse playback, it is desirable that the lower end of the magnetic tape 6 be kept in abutment with the tape lead portion 48 of the cylinder 5. In this case, the width of the magnetic tape 6 may be measured by the guide roller 4 located in a position symmetric with the guide roller 3 with respect to the cylinder 5 in FIGS. 1 to 3 and 4(a) and 4(b), while the height of the tape 6 may be adjusted by the guide roller 2 located in the position symmetric with the guide roller 1.

Although in the above embodiment the detector and the tape traveling path adjuster are attached to separate guide rollers, both may be provided in the same member. In this case, there is a slight lag during the period from the measurement of the tape width up to the tape height adjusting operation, but this lag causes no problem.

Further, in the case where the guide member located just before the incoming side of the guide cylinder 5 and the guide member just after the outgoing side of the same cylinder do not have flange portions, e.g. inclined guides, a height adjuster for adjusting the tape height may be attached to each of the guide members having flange portions, located in the nearest positions to the cylinder. This is advantageous in that the vertical displacement of the guide rollers relative to the amount of height adjustment of the magnetic tape on the cylinder 5 is smaller. But the height adjuster may be attached to guide rollers other than the guide rollers nearest to the cylinder 5.

Figure 7A:
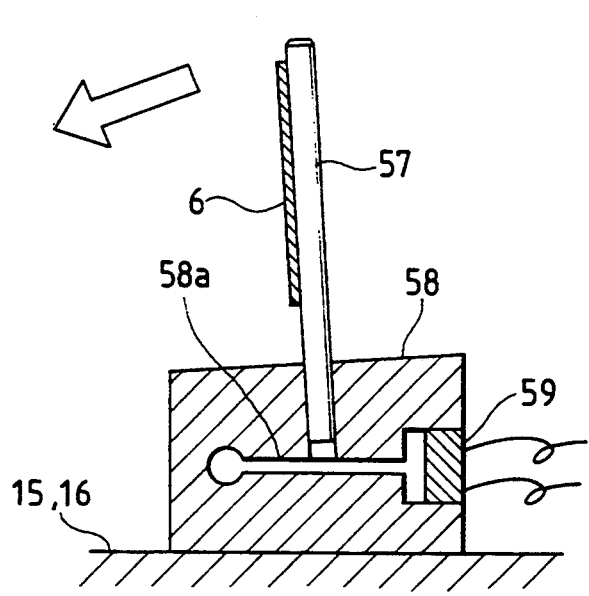
FIG. 7(a) is a sectional view showing a tape height adjuster in FIG. 1.
Figure 7B:
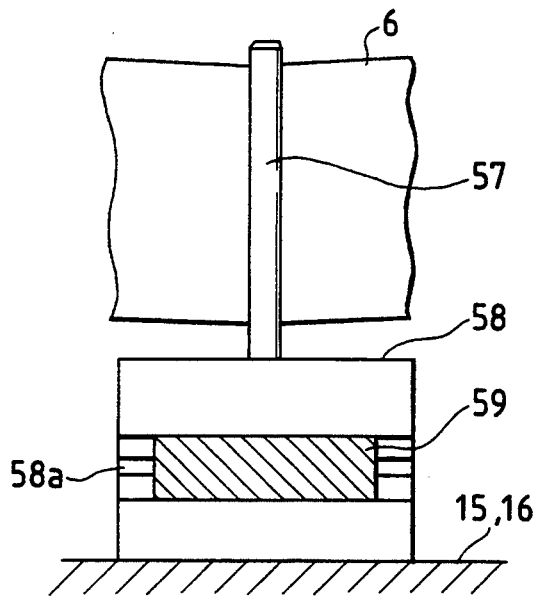
FIG. 7(b) is a front view thereof.

The height adjuster can be provided also in a guide member not having flange portions. FIG. 7(a) is a vertical sectional view showing an example of such height adjuster, and FIG. 7(b) is a front view thereof. In these figures, the numerals 57, 58, 58a, and 59 denote a guide member, a base, a slit portion, and a laminated ceramic, respectively.

In FIGS. 7(a) and 7(b), a guide member 57 such as an inclined guide for example is implanted in a base 58 which is mounted on a guide plate 15 or 16. In the base 58 a slit portion 58a is formed halfway substantially in parallel with the guide plate 15 or 16 and throughout the whole width of the base, as shown in FIG. 7(b), and a laminated ceramic 59 is fitted in an open end of the slit portion 58a. When voltage is applied to the laminated ceramic 59, the laminated ceramic expands or contracts vertically, so that the inclination of the upper portion of the base 58 than the slit portion 58a changes. Since the guide member 57 is implanted in this portion, the inclination of the guide member changes with the vertical expansion or contraction of the laminated ceramic 59.

When the guide member 57 tilts in the direction of arrow and the angle of this inclination increases, the height of the magnetic tape 6 becomes low, while when the guide member 57 tilts in the direction opposite to the arrowed direction and the tilting angle becomes small, the height of the tape 6 becomes high.

Therefore, by processing the output signal of the detector in such a manner as shown in FIG. 6 to produce a driving voltage and applying this driving voltage to the laminated ceramic 59, the height of the magnetic tape 6 can be adjusted so that the lower end of the tape 6 is in abutment with the tape lead portion 48 (FIG. 2) of the cylinder 5 at all times.

Figure 8:
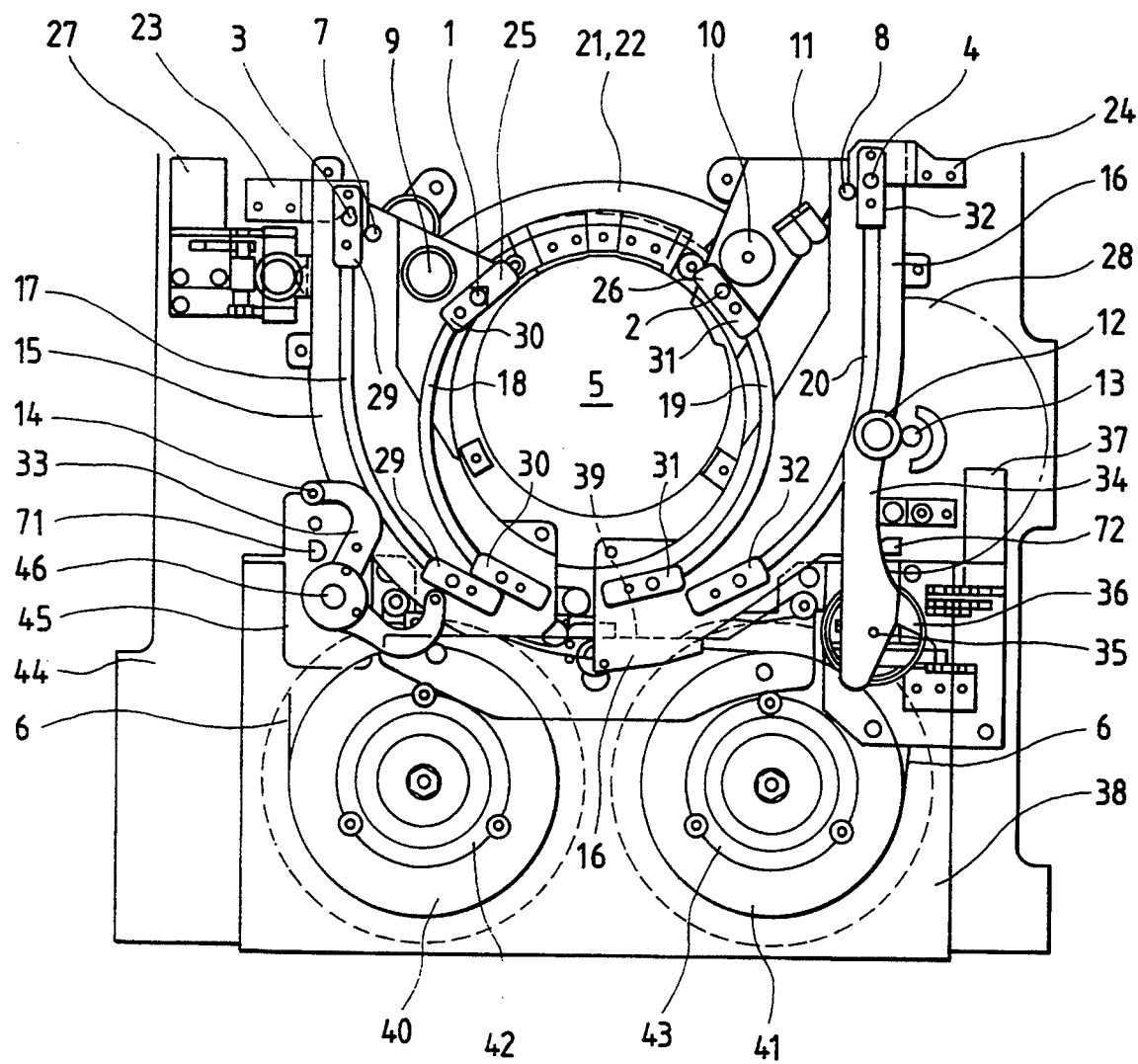
FIG. 8 is a plan view of a tape travel controlling system in a recording/reproducing apparatus according to another embodiment of the present invention.

In another embodiment, as shown in FIG. 8, tape guides ("sensor guide(s)" hereinafter) 71 and 72 contained in photosensors disposed near reels 40 and 41, respectively; a lift mechanism for moving the reels 40 and 41 vertically in the tape width direction; and a later-described control circuit, correspond to the foregoing detector, adjuster, and controller, respectively.

Figure 9:
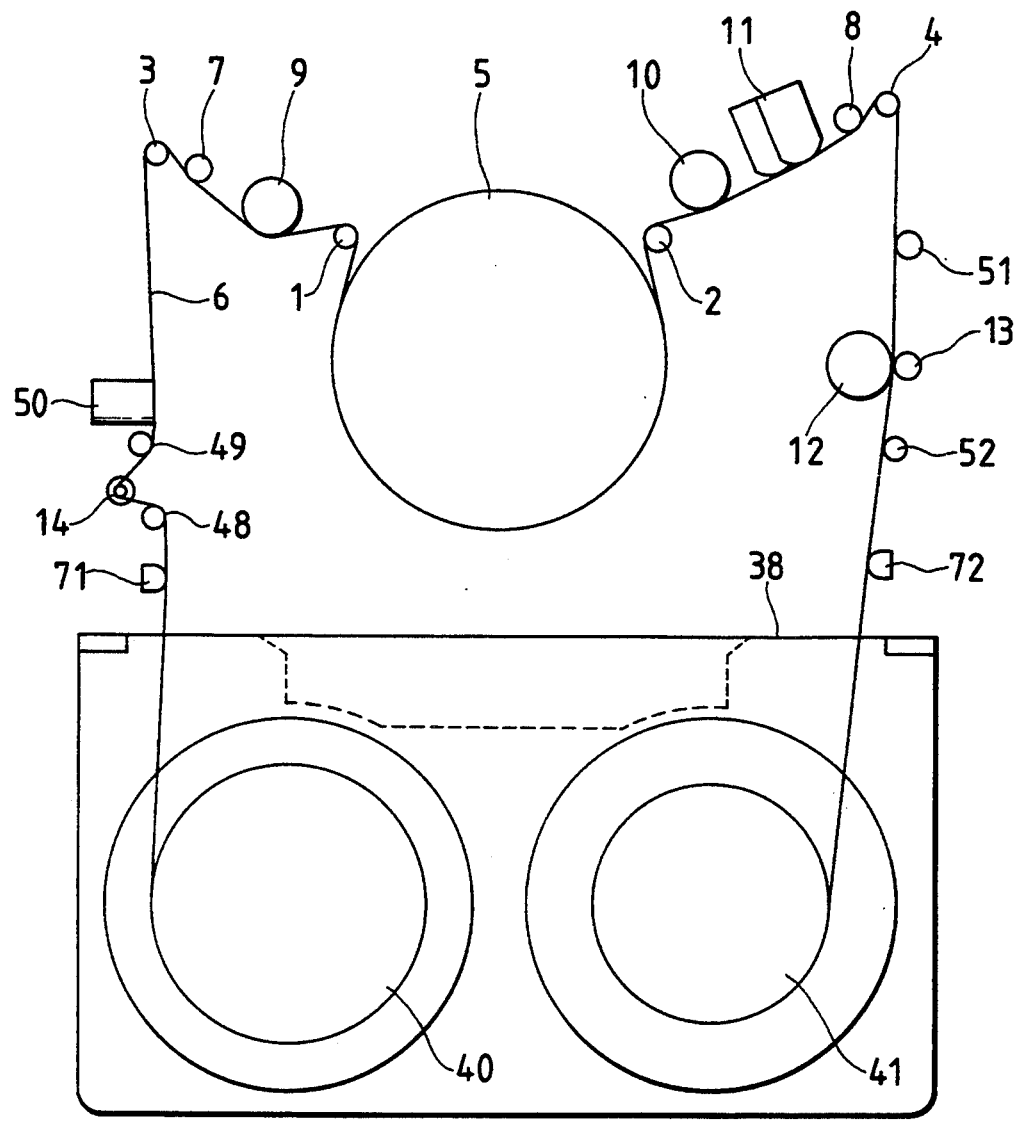
FIG. 9 is a plan view of a tape traveling path.
Figure 10:
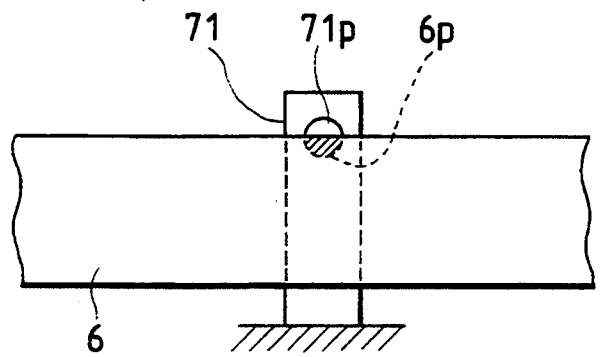
FIG. 10 is a front view showing a sensor guide.
Figure 11:
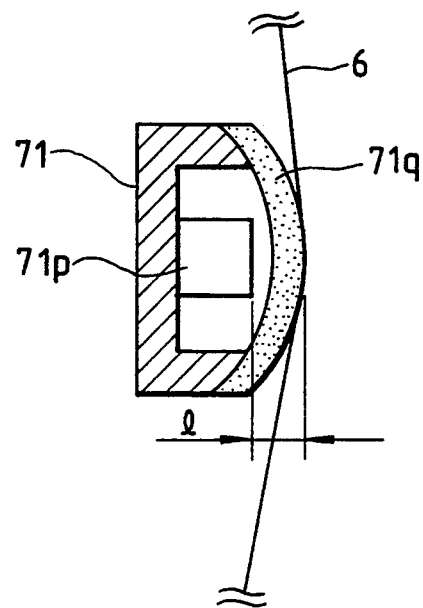
FIG. 11 is a sectional view showing the structure of the sensor guide.

The detector will first be described. In FIG. 9, the numerals 71 and 72 denote sensor guides, with which is engaged a tape 6 at a small angle to prevent the formation of a tape traveling load. FIG. 10 is a front view as seen from the tape-engaged side of the sensor guide 71 (72). A photosensor 71p is incorporated in the sensor guide 71 in a position opposed to the upper end of the tape, and a spot thereof is positioned in the above tape-engaged angle range. The photosensor 71p is fixed at a height at which the tape covers substantially a half of the photosensor 71p when the tape is traveling at a reference traveling height. FIG. 11 illustrates an internal structure of each sensor guide. The photosensor 71p is contained in a housing and is thereby protected and dustproofed. The portion 71q of the housing which comes into sliding contact with the tape 6 is formed by a transparent material (e.g. glass or plastic) through which the light from the photosensor 71p can pass. The light emitted from the photosensor 71p passes through the transparent material 71q and is applied to the tape 6. Then, as shown in FIG. 10, only the light corresponding to a tape portion 6p (hatched portion in FIG. 10) opposed to the sensor 71p is reflected, then again passes through the transparent material 71q and is received by the sensor 71p. There is obtained a signal output corresponding to the amount of the light received. In the event the traveling height of the tape 6 changes due to a stepped winding for example, the signal output from the sensor 71p also changes in accordance with the amount of variation of the height. Since in this embodiment the tape traveling height and the said signal output are correlated with each other in advance, the amount of variation in the tape traveling height can be detected continually by monitoring the said signal output.

This detector detects the height of a tape edge in an engaged state of the tape with the tape guide, so the detection can be made in a state in which the tape cannot undergo an out-of-plane deformation in the tape width directions whereby the height of a tape edge can be detected with a high accuracy.

Although this detector detects the upper end of the tape, there may be adopted a method wherein the detector detects the lower end of the tape.

Further, if sensors are disposed for both the upper and lower ends of the tape, it becomes possible to detect the tape width at the same time. For example, it becomes possible to detect a central height of the tape width with a high accuracy while taking variations in the tape width into consideration.

Figure 12:
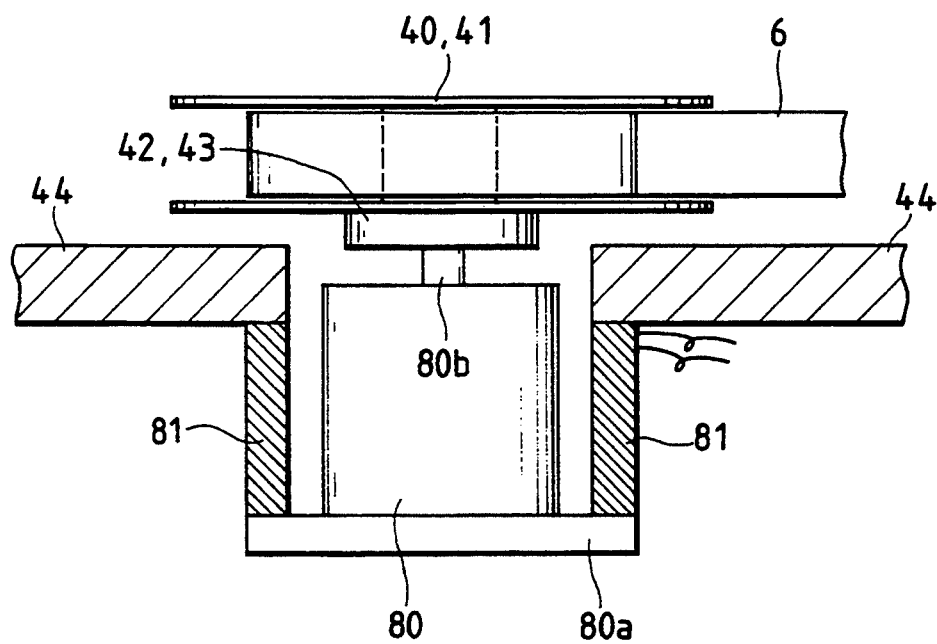
FIG. 12 is a sectional view showing a reel lift mechanism.

A first height adjuster in this embodiment will now be described. FIG. 12 is a sectional side view of a lift mechanism as a height adjuster for reels 40 and 41. In FIG. 12, the numerals 44 and 80 denote a chassis and a reel motor, respectively; numerals 42 and 43 denote reel turntables; numerals 40 and 41 denote reels; and numeral 6 denotes a tape. The reels 40 and 41 with the tape 6 wound therearound are mounted on the reel turntables 42 and 43, respectively, at a predetermined height. The reel turntables 42 and 43 are connected to a reel motor 80 through a motor shaft 80b. The reel motor 80 has a flange portion 80a at the bottom thereof in the figure. The flange portion 80a and the chassis 44 are interconnected through a cylindrical laminated ceramic 81. The laminated ceramic expands or contracts in its laminated direction in accordance with the value of voltage applied thereto. The laminated direction in FIG. 12 is the vertical direction, so the laminated ceramic can expand or contract vertically according to the value of voltage applied thereto, whereby the reels 40 and 41 can be moved vertically.

The entire operation of this embodiment as well as the controller will be described below. First, the operation on the tape supply side will be described.

Figure 13A:
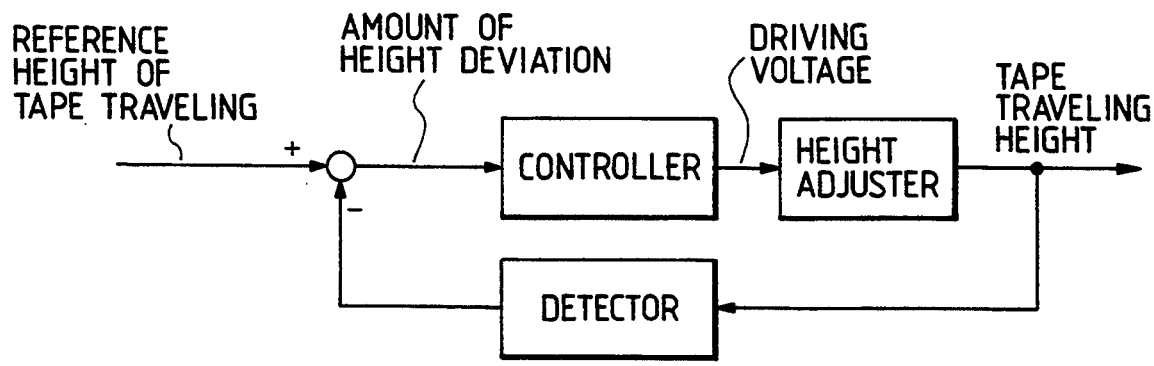
FIGS. 13(a) and 13(b) are block diagrams showing a servo system.

In FIG. 9, when the tape travels in the forward direction, the reel 40 functions as the tape supply side, while the reel 41 functions as the tape take-up side, and when the tape travels in the reverse direction, the relation of both reels becomes reverse. The supply side in the forward tape traveling, namely the reel 40 side, will now be considered. The traveling height of the tape 6 delivered from the reel 40 is detected continually by the sensor guide 71 located in a position just close to the reel 40. FIG. 13(a) is a block diagram showing the operation on the tape supply side in this embodiment. Upon input of a reference signal corresponding to the reference tape traveling height, it is compared with a signal output provided from the sensor guide 71 serving as the detector, and if there is an error caused by a stepped winding for example, this error signal is fed to the controller, which in turn provides a corresponding driving voltage to the reel lift mechanism serving as the height adjuster. As a result, even if the tape traveling height changes due to a stepped winding for example, the height of the reel 40 changes in a direction to correct the tape traveling height to the reference value, then the subsequent tape traveling height is again detected and fed back again to the comparing section. Thus, a so-called closed loop servo control is conducted. By this operation the tape traveling height in the vicinity of the tape supply reel can be maintained constant and it is possible to prevent the influence of the stepped winding. During reverse traveling of the tape, this operation on the supply side can be effected on the reel 41 side and the same effect can be obtained thereby.

Figure 13B:
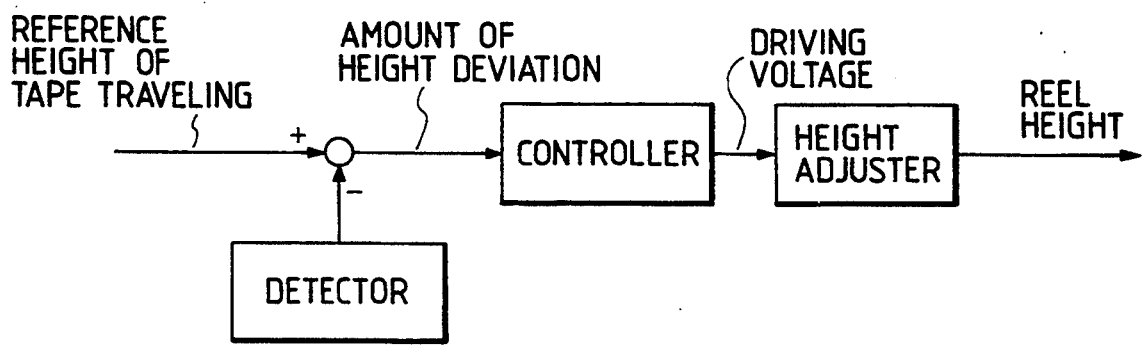

The operation on the tape take-up side will now be described. In FIG. 9, during forward traveling of the tape, the reel 41 serves as a take-up side reel. The traveling height of the tape incoming to the reel 41 is detected continually by the sensor guide 72 located in a position just close to the reel 41. FIG. 13(b) is a block diagram showing the operation on the tape take-up side in this embodiment. Upon input of a reference signal corresponding to the reference tape traveling height, it is compared with signal output provided from the sensor guide 72 serving as the detector, and if there is an error caused by a change in the tape traveling height, this error signal is fed to the controller, which in turn provides a corresponding driving voltage to the reel lift mechanism serving as the height adjuster. The height of the reel 41 changes vertically so that the tape take-up height between the flange portions of the reel 41 is kept constant even in the event of change in the tape traveling height. Thus, a so-called open loop servo control is performed. By this operation the tape take-up height on the take-up reel can be maintained constant and it is possible to prevent the formation of a stepped winding. During reverse traveling of the tape, this operation on the take-up side can be performed similarly on the reel 40 side and the same effect can be obtained.

Figure 14A:
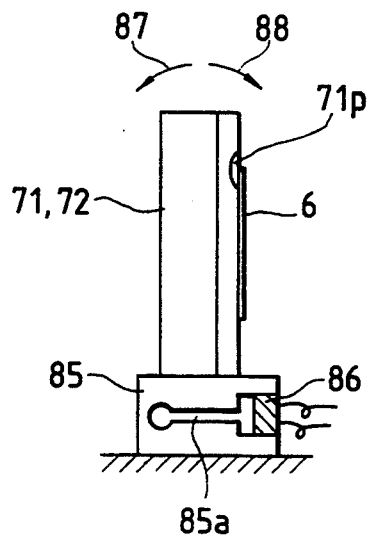
FIGS. 14(a) and 14(b) are a side view respectively and a front view, showing a second height adjuster.
Figure 14B:
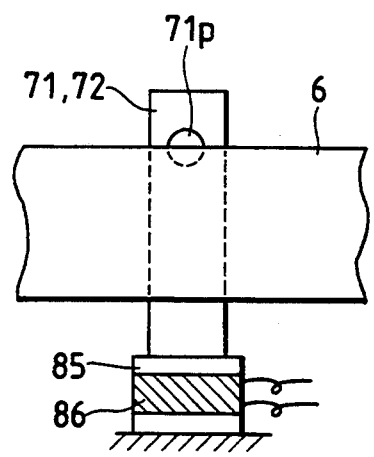

A second height adjuster will now be described. In this embodiment there is adopted a construction wherein the angle of inclination of sensor guides 71 and 72 is variable. FIGS. 14 (a) and 14(b) illustrate this construction in which FIG. 14(a) is a side view and FIG. 14(b) is a front view. The sensor guides 71 and 72 are each fixed onto a support base 85 having a slit portion 85a, and a laminated ceramic 85 is fitted in an opening end of the slit portion 85a. The laminated ceramic is laminated in the vertical direction in the figure and it expands or contracts vertically in accordance with the value of voltage applied thereto, whereby the opening-side spacing of the slit portion 85a of the support base 85 is changed. Consequently, the sensor guides 71 and 72 can be changed its angle of inclination in the directions of arrows 87 and 88 in FIG. 14(a). When the sensor guides 71, 72 tilt in the direction of arrow 87, the tape 6 undergoes a rising force, whereby the tape traveling height can be corrected upward. At this time, the amount of the correction is controlled by changing the value of voltage to be applied to the laminated ceramic. On the other hand, the sensor guides 71, 72 tilt in the direction of arrow 88, the tape 6 undergoes a descending force, whereby the tape traveling height can be corrected downward. With tilting of the sensor guides 71, 72, the height of the photosensor 71p may be changed. But since the angle of inclination of those sensor guides is so small that the change in height of the photosensor 71p is negligible.

By the second height adjuster described above there can be attained the same function on the tape supply reel side as in the foregoing first height adjusters; that is, the tape traveling height is kept constant and it is possible to prevent the influence of the stepped winding.

On the take-up side, the reel height in the first height adjuster remains the same, while the tape traveling height is changed and controlled by the second height adjusters, and eventually the height of the tape taken up onto the reel is maintained constant to prevent the formation of a stepped winding.

Although in the second height adjuster the inclination angles of the sensor guides per se are changed, tape guides separate from such sensor guides may be brought into contact with the tape and inclined, whereby the same effect as above can be obtained.

Throughout this embodiment the tape traveling in both forward and reverse directions is considered, but in the case of an apparatus wherein a tape is traveled only in one direction and so only either the influence or the formation of a stepped winding may be prevented, suitable measures may be taken only for one reel.

The present invention can be practised also in other forms than the above embodiments without departing from the spirit and main features thereof. Therefore, in all points the above embodiments are mere illustrations of the invention and should not be construed restrictively. The scope of the present invention is shown by the appended claims. Further, modifications and changes falling under a scope equivalent to that of the appended claims are all within the scope of the present invention.

What is claimed is:

1. A tape edge detector disposed in a tape traveling path of a recording/reproducing apparatus using a tape for detecting a position of a tape edge of the tape in the width direction of the tape, the tape edge being an edge of a portion of the tape engaged with a tape guide, the tape guide defining a portion of the tape traveling path when in an engaged state with the tape, wherein the tape guide has a flange portion which comes into sliding contact with a first tape edge of the portion of the tape to restrict a traveling height of the tape, and wherein the tape edge detector detects a position of a second tape edge of the portion of the tape on a side of the tape opposite to the first tape edge which comes into sliding contact with said flange portion.

2. A tape edge detector according to claim 1, wherein said tape guide has adjuster means for changing a set value of at least one of its planar position, height, angle of inclination, and direction of inclination.

3. A tape edge detector disposed in a tape traveling path of a recording/reproducing apparatus using a tape for detecting a position of a tape edge of the tape in the width direction of the tape, the tape edge being an edge of a portion of the tape engaged with a tape guide, the tape guide defining a portion of the tape traveling path when engaged with the tape, wherein said tape guide includes a transparent member having a tape-engaging surface for engaging said tape in sliding contact when said tape guide is engaged with said tape, and wherein said tape edge detector is disposed inside said tape guide such that said tape edge detector and said tape are on opposite sides of said transparent member and a detecting surface of said tape edge detector is spaced a predetermined distance from said tape-engaging surface of said transparent member.

* * * * *